H. K. PARSONS.
EYE PROTECTOR.
APPLICATION FILED FEB. 19, 1917.
1,308,366.
Patented July 1, 1919.
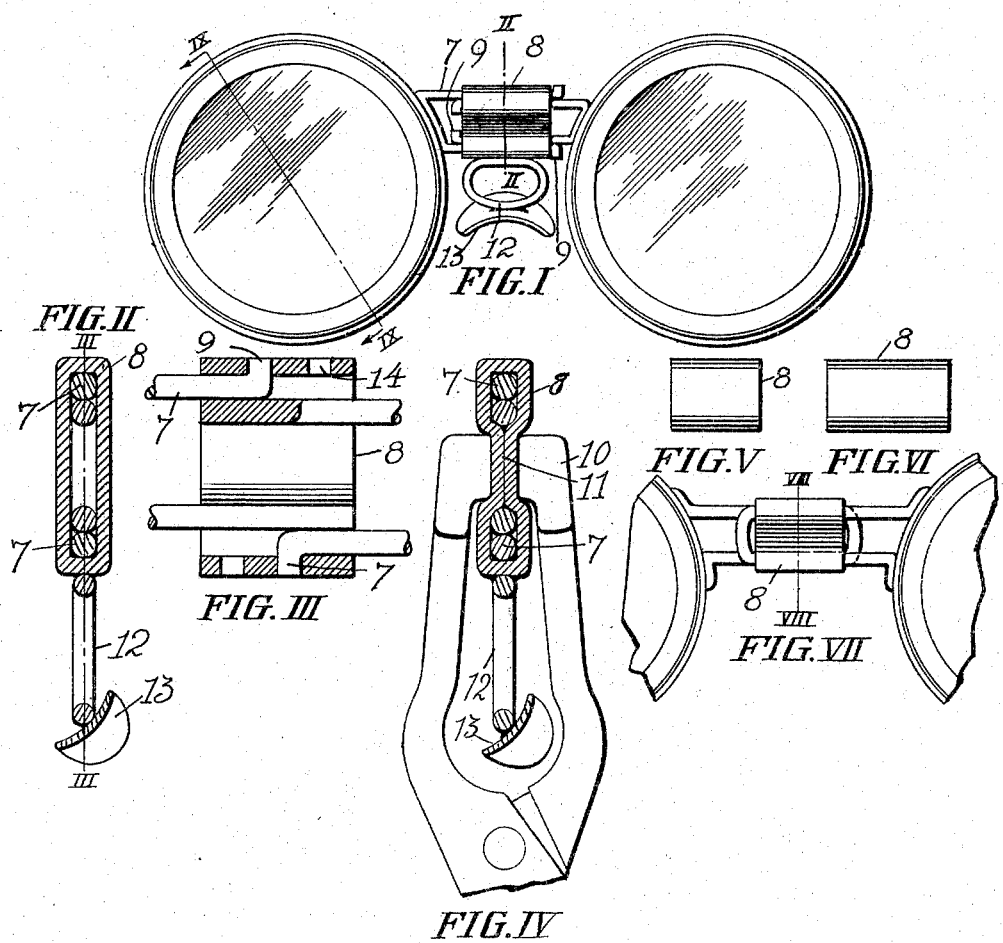
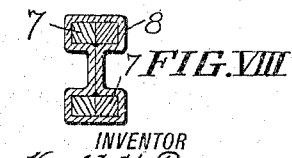
INVENTOR
Harold K. Parsons
BY
ATTORNEYS

UNITED STATES PATENT OFFICE.

HAROLD K. PARSONS, OF SOUTHBRIDGE, MASSACHUSETTS.

EYE-PROTECTOR.

1,308,366.  Specification of Letters Patent.  Patented July 1, 1919.

Application filed February 19, 1917. Serial No. 149,587.

*To all whom it may concern:*

Be it known that I, HAROLD K. PARSONS, a citizen of the United States, residing at Southbridge, in the county of Worcester and State of Massachusetts, have invented certain new and useful Improvements in Eye-Protectors, of which the following is a specification.

My invention relates to improvements in eye protectors, and has particular reference to that type of protector intended for industrial use.

One of the leading objects of my present invention is the provision of an improved protector in which the several parts may be readily assembled with employment of a minimum amount of screws or other small parts liable to be easily lost and yet in which the several parts may be adjusted as desired to fit the requirements of the individual wearer and the broken parts renewed or replaced with a minimum of difficulty.

A further object of the present invention is the provision of a protector in which the distance between the lenses may be readily adjusted as desired to suit the requirements of the individual wearer, but in which the parts when so adjusted may be locked or secured in their desired adjusted relation to prevent accidental displacement therefrom.

A further object of the invention is the provision in connection with an adjustment and securing means of this character, of improved adjustable means for engaging the nose of the wearer, which shall at all times be disposed substantially centrally of the space between the lenses in proper position for engagement with the nose.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a protector constructed in accordance with and embodying the generic principles of my invention.

Fig. II represents a sectional view taken as on the line II—II of Fig. I.

Fig. III represents a sectional view as on the line III—III of Fig. II of a slightly modified construction.

Fig. IV represents a view similar to Fig. II but illustrating the means for locking the parts in desired adjusted position.

Fig. V represents a view of one form of locking sleeve for the construction shown in Fig. I.

Fig. VI represents a view of a different size of sleeve.

Fig. VII represents a view of another slight modification of my construction.

Fig. VIII represents a sectional view as on the line VIII—VIII of Fig. VII.

As previously mentioned, my invention is particularly applicable to eye protectors for use in the industries, it being in these forms that lenses are particularly subject to breakage and the replacement without necessity of loosening small screws or the like is desirable. In addition it is desirable in this type of eye protector that the structures be such that they can be readily adjusted to fit varying faces so that a minimum of sizes or styles may be kept by the safety department or the like of the manufacturing concerns and may satisfactorily take care of the eye protection of its workmen.

I have, therefore, illustrated in Fig. I one form of my improved adjustable bridge for ready fitting to the face, this bridge facilitating both original fitting of the mounting and also subsequent replacement of either of the frames should it become broken, without the necessity of throwing away the entire protector. In this construction I have shown as secured to each of the frames the U-shaped bridging member 7 having parallel inwardly extending arms, the arms of the two members interlocking one with the other and being held in sliding engagement by the sleeve 8, which is loosely mounted on the arms, as indicated in Fig. II. The arms are here shown as each terminating in the outwardly bent or headed end 9 adapted to interlock with the edge of the sleeve to prevent accidental separation of the parts.

In the use of this form of my invention the protector is placed on the face of the prospective wearer and the parts slid in and out till the exact desired adjustment is attained, when the parts are removed and gripped between a pair of pliers 10 or the like and the sleeve compressed to tightly bite into and grip the interlocking U members 7, the central part being closed up as indicated at 11, Fig. IV, so that there is no possibility of the arm springing inward to disengage the head 9 from the end of the sleeve. In this type of construction I may to advantage make use of the form of sleeve illustrated in Figs. V and VI, that is to say, the sleeves here illustrated being of varying sizes so that a long or short sleeve may be substituted one for the other before locking of the parts accordingly as a short or wide P. D. is desired.

At the same time to render the mounting most comfortable on the face, I preferably secure to the sleeve a suitable adjustable nose rest support 12 which I have here illustrated in the form of a closed ring soldered centrally to the sleeve 8 and at the opposite side soldered to the upper face of the crest pad or nose engaging member 13, whereby this member is held in correct position to properly engage the nose, while being capable of adjustment relative to the sleeve by flattening or twisting of the adjustable member 12, thus making it possible by proper bending of the member 12 and proper choice of sleeve 8 to obtain the exact desired adjustment of the protector to fit the individual.

In Fig. III, I have illustrated a slightly different form of my construction, in which in place of interchangeable sleeves being employed a single sleeve may be employed provided with a plurality of apertures 14 adapted to receive the ends 9 of the members 7, in this event one end of the member 7 of each frame being received in the aperture 14 and the other end being simply straight and lying within the sleeve. In this form the adjustment is attained by springing inward of the members having the bent ends 9 and engaging in suitable apertures 14 to suit the individual requirements, and then subsequently crimping or compressing the sleeve 8 as shown in Fig. IV to lock the parts and prevent subsequent inward springing thereof, whereby the parts are firmly and securely locked in desired adjusted position. On the other hand, if it is desired to change this adjustment it is merely necessary to take an ordinary screw driver or like implement and pry apart or open up the sleeve, when the new adjustment can be effected.

In Figs. VII and VIII, I have shown a reversal of the construction shown in Fig. I in which the ends of the U are secured to the frame and the loop or bight extends inward, the sleeve in this instance being crimped between the two loops or bights and thus locking the parts in their desired adjusted relation. It will be noted that in Fig. VIII, I have shown the parts as formed from square or rectangular stock in place of round as illustrated in some of the other views, it being understood that various shapes of stock for the bridging or connecting members may be employed if desired without in any wise varying the essential principles here illustrated and described.

I claim:

1. In an eye protector, the combination with lens receiving frames, of means for connecting the frames, including a bridge having telescoping portions, a sleeve mounted on said telescoping portions adapted to be locked in desired adjusted relation thereto, a ring carried by the sleeve and depending therefrom, and a crest pad carried by the ring and adjustable by bending of the latter.

2. An eye protector, including lens receiving frames and telescoping bridge members carried by said frames, and a sleeve embracing the telescoping members and clamped thereonto to lock said members in desired adjusted relation.

3. In an eye protector, the combination with lens retaining frames, of bridging members each secured to one of the frames and extending inwardly therefrom and terminating in headed ends, and a locking member embracing said bridging members and interlocking with the headed ends thereof to secure the parts in desired adjusted relation.

In testimony whereof I affix my signature in the presence of two witnesses.

HAROLD K. PARSONS.

Witnesses:
 EDITH M. HALVORSEN,
 ESTHER M. LAFLER.

Copies of this patent may be obtained for five cents each, by addressing the "Commissioner of Patents, Washington, D. C."